(12) United States Patent
Cho

(10) Patent No.: US 12,718,095 B2
(45) Date of Patent: Aug. 25, 2026

(54) PROCESSING APPARATUS FOR NEURAL NETWORK CALCULATION AND METHOD FOR OPERATING THE SAME

(71) Applicant: Deep ET, Seoul (KR)

(72) Inventor: Yong Beom Cho, Seoul (KR)

(73) Assignee: Deep ET, Seoul (KR)

( * ) Notice: Subject to any disclaimer, the term of this patent is extended or adjusted under 35 U.S.C. 154(b) by 786 days.

(21) Appl. No.: 18/171,125

(22) Filed: Feb. 17, 2023

(65) Prior Publication Data

US 2023/0267325 A1 Aug. 24, 2023

(30) Foreign Application Priority Data

Feb. 18, 2022 (KR) ........................ 10-2022-0021399

(51) Int. Cl.
*G06N 3/08* (2023.01)
*G06F 15/80* (2006.01)

(52) U.S. Cl.
CPC ........... *G06N 3/08* (2013.01); *G06F 15/8007* (2013.01)

(58) Field of Classification Search
CPC .............................. G06N 3/08; G06F 15/8007
See application file for complete search history.

(56) References Cited

U.S. PATENT DOCUMENTS

2019/0347550 A1* 11/2019 Jung ...................... G06N 3/084
2020/0026988 A1* 1/2020 Guo ....................... G06N 3/082
2022/0137869 A1* 5/2022 Kim ...................... G11C 11/408 711/154
2022/0245444 A1* 8/2022 Golub .................... G06N 3/084
2022/0368355 A1* 11/2022 Kumar Vankayala ....................... H04W 28/0268

FOREIGN PATENT DOCUMENTS

KR 10-2137802 B1 7/2020
KR 10-2020-0141663 A 12/2020
KR 10-2256288 B1 5/2021
WO 2019243962 A1 12/2019
WO WO-2022235517 A2 * 11/2022 ............. G06N 3/048

* cited by examiner

*Primary Examiner* — Mark D Featherstone
(74) *Attorney, Agent, or Firm* — Bridgeway IP Law Group, PLLC; Jihun Kim

(57) ABSTRACT

A processing apparatus for a neural network calculation and an operating method thereof are proposed. The processing apparatus for a neural network calculation according to an exemplary embodiment includes a plurality of processor units which performs the learning of a neural network, a plurality of weight memories provided to store a weight corresponding to each of a plurality of layers which forms the neural network, and a main memory which acquires and stores the weight updated from the plurality of weight memories when the learning is completed.

5 Claims, 6 Drawing Sheets

PROCESSING APPARATUS FOR NEURAL NETWORK CALCULATION AND METHOD FOR OPERATING THE SAME

CROSS-REFERENCE TO RELATED APPLICATIONS

This application claims the priority of Korean Patent Application No. 10-2022-0021399 filed on Feb. 18, 2022, in the Korean Intellectual Property Office, the disclosure of which is incorporated herein by reference.

BACKGROUND

Field

The present disclosure relates to a processing apparatus for a neural network calculation and a method for operating the same, and more particularly, to a neural processing unit having a structure with a memory which stores a weight of a neural network added thereto.

Description of the Related Art

Generally, a neural network calculation in a computing device of the related art including a graphic card is mainly performed by a graphics processing unit (GPU). In contrast, the central processing unit (CPU) serves to manage training data, manage input/output data, store an initial value and a computational value of a weight, and transmit the value to a memory of the GPU.

With regard to this, FIG. 1 illustrates a processing device structure of a computing device of the related art.

Referring to FIG. 1, if a capacity of a memory of the GPU (that is, a memory of a graphic card) is sufficient, the data movement occurs only when an initial value of the weight migrates from the CPU side memory to the GPU side memory and a final value of an updated weight after completing a neural network calculation migrates from the GPU side memory to the CPU side memory. However, if the GPU side memory is not sufficient, a task for moving an intermediate result value of the GPU side memory to the CPU side memory and a task of moving an intermediate value in the CPU side memory to the GPU side memory need to be consistently performed so that the overall neural network calculation ability is degraded. In other words, a performance of the neural network algorithm such as CNN is affected by the number of data movements between a memory of a computing device PC and a GPU side memory.

Accordingly, in order to improve the performance of the neural network algorithm, a development of a structure capable of reducing the number of data movements (transfers) between the memory of the computing device PC and the GPU side memory is demanded.

In the meantime, the neural processing unit (NPU) is a processing apparatus which is developed to process an operation of an artificial neural network (ANN) algorithm at a high speed and efficiently processes a large scaled parallel operation which needs to simultaneously process a huge amount of operations so that it is mainly utilized for deep machine learning. That is, the NPU is designed to process a simpler operation than the GPU, with a matrix multiplication. Specifically, the deep machine learning which uses a deep neural network (DNN) needs to perform complex matrix multiplication which is formed of several layers to process one input data. In this case, when the NPU is applied, the operation may be performed at a relatively faster speed than the GPU.

The background art of the present disclosure is disclosed in Korean Registered Patent Publication No. 10-2137802.

SUMMARY

The present disclosure is to solve the problems of the related art and an object of the present disclosure is to provide a processing apparatus for a neural network calculation which includes a plurality of weight memories to reduce a bottle-neck problem between a processor and a memory and a method for operating the same.

However, objects to be achieved by various embodiments of the present disclosure are not limited to the technical objects as described above and other technical objects may be present.

As a technical means to achieve the above-described technical object, according to an aspect of the present disclosure, a processing apparatus for a neural network calculation may include a plurality of processor units which performs the learning of a neural network; a plurality of weight memories provided to store a weight corresponding to each of a plurality of layers which forms the neural network; and a main memory which acquires and stores the weight updated from the plurality of weight memories when the learning is completed.

Further, each of the plurality of processor units may include: a calculation unit which performs a calculation process for generating output data based on input data of any one layer of the plurality of layers and a target weight acquired from any one weight memory among the plurality of weight memories corresponding to the any one layer; and a weight updating unit which performs an updating process of updating and storing the target weight in any one weight memory by performing back propagation based on the output data.

Further, the calculation unit may include an adder and a multiplier.

Further, the plurality of processor units may be provided with a parallel distributed processing structure in which each processor unit independently performs the calculation process and the updating process.

Further, the processing apparatus for neural network calculation according to the exemplary embodiment of the present disclosure further may include a controller which generates a first control signal associated with at least one of the calculation process and the updating process and a second control signal associated with data transfer between the plurality of weight memories and the main memory.

Further, the plurality of processor units may be provided with a single instruction multiple data (SIMD) structure in which each processor unit performs the computation process in parallel based on different input data, based on the first control signal.

Further, the controller generates the second control signal after completing the learning to suppress the transition between the main memory and the plurality of weight memories before completing the learning.

In the meantime, according to another aspect of the present disclosure, a method for operating a processing apparatus for neural network calculation may include performing the learning of the neural network by acquiring the weight from a plurality of weight memories which stores a weight corresponding to each of a plurality of layers which forms a neural network, by a plurality of processor units; and acquiring and storing the weight updated from the plurality of weight memories in a main memory when the learning is completed.

Further, the performing of learning may include: performing a calculation process for generating output data based on input data of any one layer of the plurality of layers and a target weight acquired from any one weight memory among the plurality of weight memories corresponding to the any one layer; and performing an updating process of updating and storing the target weight in any one weight memory by performing back propagation based on the output data.

Further, according to an aspect of the present disclosure, a method for operating a processing apparatus for neural network calculation may include generating a first control signal associated with at least one of the calculation process and the updating process, by a controller; and generating a second control signal associated with data transfer between the plurality of weight memories and the main memory, by the controller.

Further, the generating of a second control signal may be performed after completing the learning to suppress the transition between the main memory and the plurality of weight memories before completing the learning.

The above-described solving means are merely illustrative but should not be construed as limiting the present disclosure. In addition to the above-described embodiments, additional embodiments may be further provided in the drawings and the detailed description of the present disclosure.

According to the above-described solving means of the present disclosure, a processing apparatus for a neural network calculation which includes a plurality of weight memories to reduce a bottle-neck problem between the processor and the memory and a method for operating the same may be provided.

According to the above-described solving means of the present disclosure, the bottle-neck problem for data transfer between the processor and the memory required for the neural network calculation process may be reduced to improve the performance of the neural network and save a power consumed for the data movement.

According to the above-described solving means of the present disclosure, the neural network calculation may be performed by a neural network processing unit (NPU) designed to perform the calculation operation and the central processing unit (CPU) may be involved only to an input/output part of data associated with the neural network so that the entire learning and inference operation may be performed by a relatively simpler process.

However, the effect which can be achieved by the present disclosure is not limited to the above-described effects, there may be other effects.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
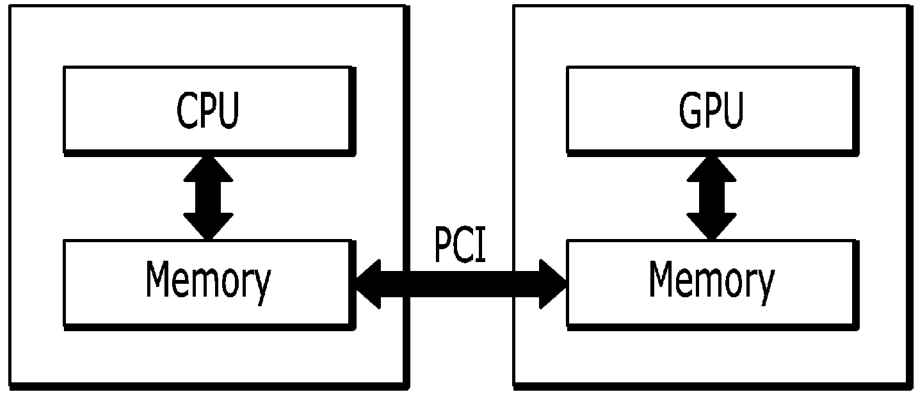
FIG. 1 illustrates a processing apparatus structure of a computing device of the related art.

Hereinafter, the present disclosure will be described more fully with reference to the accompanying drawings, in which exemplary embodiments of the present disclosure are shown. However, the present disclosure can be realized in various different forms, and is not limited to the embodiments described herein. Accordingly, in order to clearly explain the present disclosure in the drawings, portions not related to the description are omitted. Like reference numerals designate like elements throughout the specification.

Throughout this specification and the claims that follow, when it is described that an element is "coupled" to another element, the element may be "directly coupled" to the other element or "electrically coupled" or "indirectly coupled" to the other element through a third element.

Through the specification of the present disclosure, when one member is located "on", "above", "on an upper portion", "below", "under", and "on a lower portion" of the other member, the member may be adjacent to the other member or a third member may be disposed between the above two members.

Through the specification of the present disclosure, unless explicitly described to the contrary, the word "comprise" and variations such as "comprises" or "comprising", will be understood to imply the inclusion of stated elements but not the exclusion of any other elements.

The present disclosure relates to a processing apparatus for a neural network calculation and a method for operating the same, and more particularly, to a neural processing unit having a structure with a memory which stores a weight of a neural network added thereto.

Figure 2:
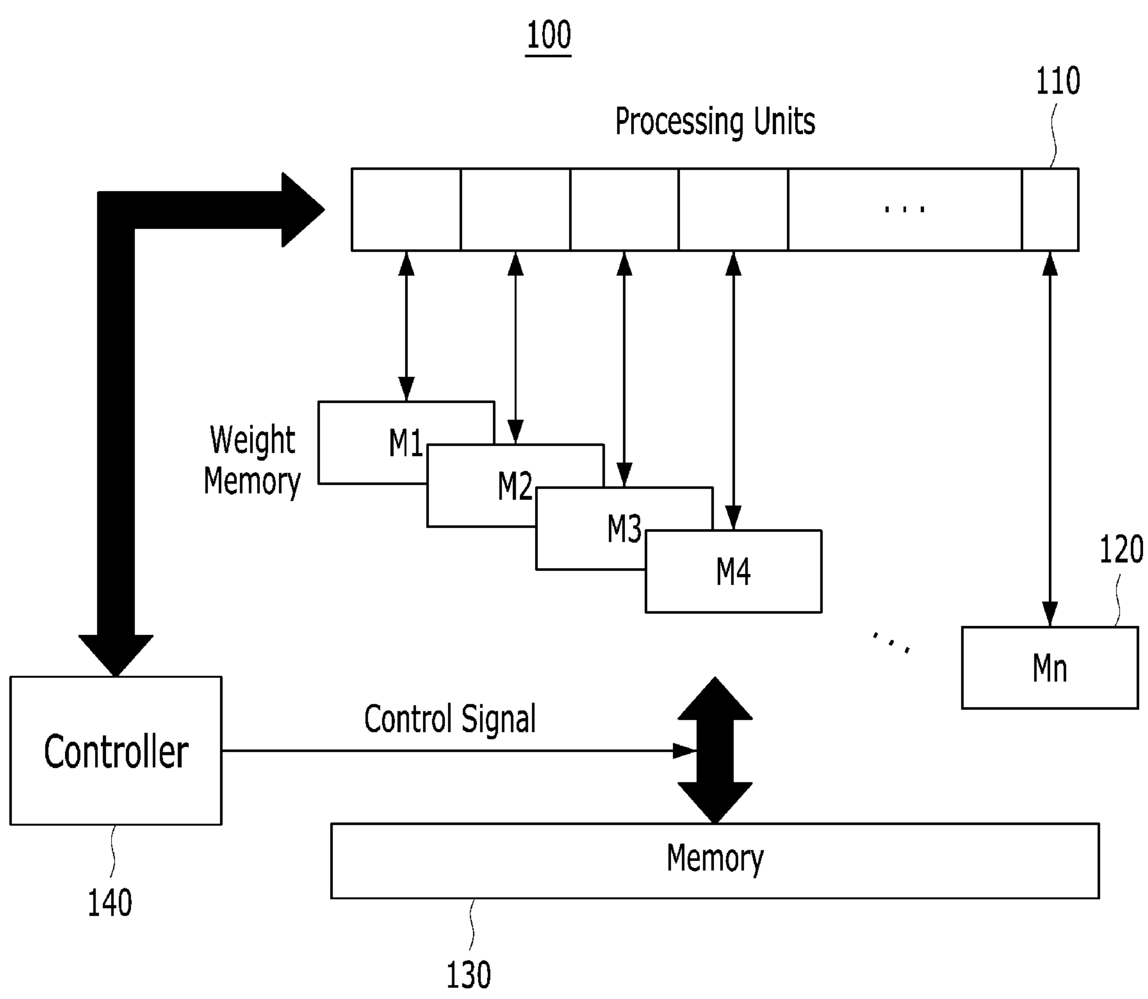
FIG. 2 is a schematic diagram of a processing apparatus for a neural network calculation according to an exemplary embodiment of the present disclosure.

FIG. 2 is a schematic diagram of a processing apparatus for a neural network calculation according to an exemplary embodiment of the present disclosure.

Referring to FIG. 2, the processing apparatus 100 for a neural network calculation according to an exemplary embodiment (hereinafter, referred to as "processing apparatus 100") may include a plurality of processor units 110, a plurality of weight memories M1, M2, . . . , Mn 120, a main memory 130, and a controller 140.

The processor unit 110 may perform the learning of the neural network. In the meantime, in the description of the exemplary embodiment of the present disclosure, the neural network may be a general term referring to an artificial intelligence-based model having a problem-solving ability by changing a synaptic coupling strength through the learning of an artificial neuron (node) which forms a network by the synaptic coupling.

For example, the neural network may be a convolutional neural network (CNN), but is not limited thereto. As another example, the neural network may broadly include various artificial intelligence-based models which have been known in the related art or will be developed in the future, such as a recurrent neural network (RNN), a deep belief network (DBN), a generative adversarial network (GAN), a relation network (RL), a deep neural network (DNN), and a deep learning network.

Further, according to an exemplary embodiment of the present disclosure, the plurality of processor units 110 of the processing apparatus 100 may be provided with a parallel distributed processing (PDP) structure in which each processor unit 110 independently performs a calculation process for learning to be described below (to be more specific, a process including a calculation process of a calculation unit 111 and an updating process of a weight updating unit 112).

Accordingly, the processing apparatus 100 allows individual processor units 110 which are provided in parallel to independently perform the calculation without being associated with the other processor unit 110 so that even though a plurality of processor units 110 is disposed, it is advantageous in that the neural network calculation may be simultaneously performed.

Further, according to the exemplary embodiment of the present disclosure, the plurality of processor units 110 of the processing apparatus 100 may be provided with a single instruction multiple data (SIMD) structure in which each processor unit 110 performs the calculation process in parallel based on different input data based on a control signal (first control signal) generated by a controller 140 to be described below.

Further, the plurality of weight memories 120 may be provided to store a weight corresponding to each of a plurality of layers which forms the neural network. With regard to this, the plurality of layers which forms a neural network may be divided into an input layer, a hidden layer, an output layer, and the like.

Specifically, as described above, the neural network of the present disclosure is a stack-type neural network including multiple layers, each layer includes a plurality of nodes called neurons, and each node or neuron may refer to a calculation unit including one or more inputs and outputs. Each input and each output (input data or a feature map) from a plurality of neurons of each layer may be supplied to each neuron of an adjacent layer.

In the meantime, the neural network according to an exemplary embodiment of the present disclosure may include a fully connected layer between the hidden layer and the output layer. When the neural network according to the exemplary embodiment of the present disclosure includes the above-described fully connected layer, the fully connected layer may be determined as a layer which is connected immediately before the output layer.

Further, in the entire specification of the present disclosure, a term referring to a layer of the neural network may also be expressed as a convolution layer, a sub-sampling layer, or a pooling layer, as well as an input layer, a hidden layer, and an output layer. Further, it is understood that one input layer or one hidden layer in the present disclosure includes a convolution layer, a sub sampling layer, a pooling layer, and the like in detail.

Further, the input layer may be a layer which outputs a feature map based on the input data applied to the processing apparatus 100. Here, the feature map may be data representing a recognition or search result representing a decision of whether a predetermined feature is included in the input data. With regard to this, information about which feature is recognized or searched from the input data by each of the plurality of input neurons of the input layer may be included in a weight to be described below.

For example, when a type of a neural network which is built (trained) by the processing apparatus 100 is a CNN, and the like, the input data may be image data, but is not limited thereto. Specifically, the image data may be expressed as data having a width W, a height H, and a depth D and may be denoted by W×H×D. Here, the terms of width, height, and depth may be replaced with a column, a row, and the number of channels, respectively. Here, the width W and the height H may be values determined based on the number of pixels of the image data. For example, the image data having 32 pixels in a horizontal direction and 32 pixels in a vertical direction may be represented as 32×32 matrix and each component of the matrix may be a pixel value of a corresponding position of the image data.

As another example, image data having a gray scale may be expressed by a single matrix formed of a gray value of each pixel and color image data may be expressed by three independent matrices (depth or the number of channels 3) which are divided into an R value matrix, a G value matrix, and a B value matrix.

Further, the hidden layer may be configured by a plurality of layers and a first hidden layer adjacent to the input layer may output a new feature map which is a result of recognizing or searching for another feature which may be included in the feature map, with a feature map output from the input layer as an input. Further, the new feature map may be applied as an input of a subsequent hidden layer. In summary, the input of the hidden layer becomes a feature map which is an output result of the input layer or an immediately previous hidden layer of the hidden layer and each hidden layer may output a new feature map which is a result of recognizing or searching for another feature from the feature map.

That is, the recognition result for features of the input data (specifically, image data) may be iteratively output while passing through the input layer and the hidden layer. That is, the neural network iteratively outputs the feature map based on the calculation process performed by the calculation unit 111 to be described below to search for and output a robust feature which represents the entire input data (image, etc.) and the processing apparatus 100 may perform analysis, classification, or the like on the input data through the output features to output a result.

Here, the output data may refer to, for example, an object recognition result included in the image data applied as input data or a classification result to a predetermined category of the image data and further may be a concept including accuracy information of the object recognition result or the classification result output by the processing apparatus 100. That is, the output data in the present disclosure may include at least one of an object recognition result or a classification result of input data which is finally determined and output through an artificial intelligence-based model generated by the processing apparatus 100, or accuracy information (whether it is a correct answer, whether it is an error, a reliability, or the like) of the result.

According to an exemplary embodiment of the present disclosure, the plurality of weight memories 120 may partition a single memory included in the processing apparatus 100. At this time, the partition structure (for example, the number of partition memories or each memory allocation amount) may be determined based on the number of layers which forms the neural network, the number of neurons, and the like. For example, the plurality of weight memories 120 may refer to each partition memory obtained by partitioning a single memory, based on the number of input neurons, the number of hidden layers, the number of neurons included in the hidden layer, and the like.

In the meantime, the weight in the present disclosure is understood to be the same as a filter applied to the neural network calculation and a weight matrix. For example, when the neural network is a CNN, the weight may be denoted by K×K matrix and at this time, the K value may refer to a magnitude of the weight or a filter size.

According to the exemplary embodiment of the present disclosure, the plurality of weight memories 120 may include a spin-torque transfer (STT) memory or a nonvolatile binary memory, but is not limited thereto. The weight memory may be a dynamic random access memory (DRAM), a phase change memory (PCM), a volatile memory, a nonvolatile memory, or the like. According to the exemplary embodiment, each weight memory 120 may be implemented by a plurality of types of memories.

Further, according to the exemplary embodiment of the present disclosure, the plurality of weight memories 120 may be provided so as to correspond to a plurality of hidden neurons (not illustrated) of the hidden layer and may be further included to store a weight corresponding to the plurality of hidden neurons (not illustrated). At this time, the plurality of weight memories 120 may be expressed to store a weight in association with the hidden layer.

For example, the plurality of weight memories 120 may be provided as many as the number of the plurality of hidden neurons (not illustrated) and may be further provided so as to store a weight corresponding to each of the plurality of hidden neurons (not illustrated).

Further, an initial value of the weight which is stored in each of the plurality of weight memories 120 may be determined by LeCun Initialization, Xavier Initialization (Glorot Initialization), or He Initialization techniques.

Further, when the learning of the neural network which is performed by the plurality of processor units 110 and the plurality of weight memories 120 is completed, an updated weight which is acquired from the plurality of weight memories 120 may be stored in the main memory 130.

With regard to this, the controller 140 may generate a first control signal associated with at least one of a calculation process and an updating process performed in the processor unit 110 and a second control signal associated with data transfer between the plurality of weight memories 120 and the main memory 130.

During the process of performing the learning of the neural network, the controller 140 may repeatedly perform the process of generating a first control signal to provide an initial value of the weight stored in the weight memory 120, an intermediate result value according to the learning, and the like to the processor unit 110 which performs a calculation according to each layer of the neural network and updating and storing the updated weight in the weight memory 120 based on the calculation result of the processor unit 110.

In the meantime, the controller 140 operates so as not to generate a second control signal associated with the main memory 130 in the middle of the above-described learning of the neural network to prevent the transition between the main memory 130 and the plurality of weight memories 120 before completing the learning of the neural network.

Further, according to the exemplary embodiment of the present disclosure, in order to perform the learning of the neural network having a predetermined layered structure by means of the processing apparatus 100, the controller 140 may generate a first control signal including a mapping signal which previously allocates a mapping relationship between the plurality of processor units 110 and the plurality of weight memories 120 provided in the processing apparatus 100 based on the feature information of a neural network to be trained (built). To be more specific, the controller 140 may select a processor unit 110 which performs the calculation process and the updating process for training the neural network among the plurality of processor units 110 mounted in the processing apparatus 100 in consideration of the number of layers of the neural network, the number of neurons included in each layer, a size of input data, and the like and select a weight memory 120 which stores a weight to be used for the processor unit 110 corresponding to each of the selected processor units 110, among the weight memories 120.

With regard to this, when the plurality of processor units 110 mounted in the processing apparatus 100 includes a plurality of types of processors having different characteristic of the computational resource, the controller 140 allocates the calculation of the neural network layer which has a relatively large amount of calculation or requires a high computational complexity to a processor having a relatively abundant computational resources based on the resource information of the plurality of processor units 110. In response to this, a mapping signal may be generated to map a weight memory 120 which has a relatively larger memory capacity or has a relatively faster data access speed to the allocated processor unit 110, but is not limited thereto.

Thereafter, when the processing apparatus 100 determines that the learning of the neural network is completed, the controller 140 generates a second control signal associated with the main memory 130 to transmit a weight updated according to the learning of the neural network to the plurality of weight memories 120 to main memory 130 and stores the final weight according to the training result in the main memory 130.

Figure 3:
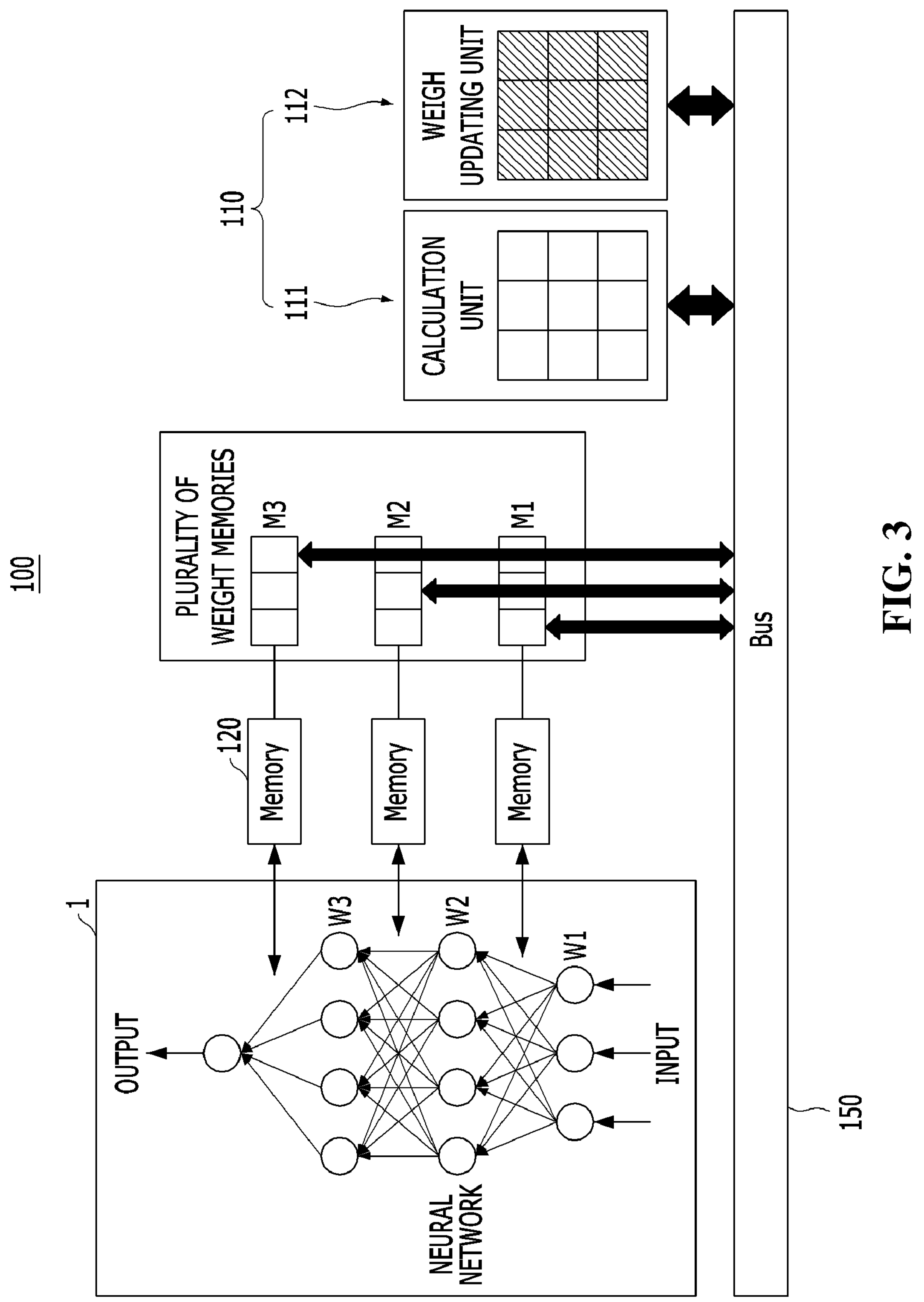
FIG. 3 is a view illustrating an implemented example of a processing apparatus for a neural network calculation according to an exemplary embodiment of the present disclosure.

FIG. 3 is a view illustrating an implemented example of a processing apparatus for a neural network calculation according to an exemplary embodiment of the present disclosure.

Referring to FIG. 3, each processor unit 110 of the processing apparatus 100 may include a calculation unit 111 and a weight updating unit 112.

The calculation unit 111 may perform a calculation process for generating output data based on input data of any one layer of a plurality of layers which forms the neural network and a target weight acquired from any one weight memory, among a plurality of weight memories 120 corresponding to the corresponding layer (that is, any one layer).

Further, according to the exemplary embodiment of the present disclosure, the calculation unit 111 may be provided with a structure including an adder and a multiplier. With regard to this, the structure of the neural network is configured by a synapse which connects between neurons which generally determine an output by a weight and a calculation for the learning or inference of the neural network is mostly formed by addition and multiplication. Accordingly, even though the structure of the neural network is implemented with a parallel structure by a plurality of processors, the calculation itself may be performed only by the adder and the multiplier. However, most of NPUs developed (designed) in the past is not aimed at implementing neural networks, but graphic vector calculations or digital signal processing (DSP) calculation are considered as major calculations and the neural network calculation needs to be performed using a structure for the calculation. Accordingly, there was a limit to form a complex structure to achieve an original purpose. In other words, since a plurality of NPUs which has been already developed is designed to provide other auxiliary functions other than the neural network calculation, the hardware complexity is high. Further, software for driving the NPUs is not open so that the implementing difficulty is evaluated to be very high. However, the processing apparatus 100 disclosed in the present disclosure corresponds to an NPU structure designed to perform a calculation for learning or inference of the neural network so that the implementing difficulty is relatively low.

The weight updating unit 112 may perform an updating process of updating and storing the target weight (in other words, a weight of the corresponding layer called from the specific weight memory 120) in the corresponding weight memory 120 (that is, any one weight memory) by performing back propagation based on output data generated by the calculation unit 111.

Further, referring to FIG. 3, the processing apparatus 100 disclosed in the present disclosure may include a bus 150 which is a passage for transmitting/receiving (exchanging) data (for example, weight information stored in the weight memory 120, etc.), between the processor unit 110 and the weight memory 120. However, it is not limited thereto and the bus 150 may serve as a passage through which various data transmitted/received (exchanged) between sub modules mounted in the processing apparatus 100, such as the processor unit 110, the weight memory 120, the main memory 130, the controller 140, and the like.

In the meantime, a conceptual view illustrated in the left side of FIG. 3 illustrates an exemplary neural network structure 1 and a right side illustrates a schematic diagram of a neural network structure 1 actually implemented as hardware. With regard to this, once a hardware structure of the processing apparatus 100 is designed and then fixed, it is difficult to modify the hardware structure of the processing apparatus so that it is difficult to design so as to completely correspond to the conceptual view of the neural network structure 1 of the left side. When the processing apparatus 100 is implemented (designed) so as to completely comply with the conceptual structure of the neural network structure 1, the processing apparatus 100 may not be utilized for other functions (for example, other calculating functions which are available by the GPU, CPU, or the like) than the neural network calculation. By considering this, the inventor of the present disclosure designed the processing apparatus 100 with a structure capable of performing the parallel single instruction multiple data (SIMD) processing as illustrated in the right schematic diagram on the right side of FIG. 3 to design such that a plurality of processor units 110 simultaneously (within a tolerance range which may be considered as substantially the same time) may perform as many calculation processes as possible. That is, the processing apparatus 100 disclosed in the present disclosure individually disposes the weight memory 120 for the neural network calculation and suppresses the transition with the main memory 130 until the learning calculation of the neural network structure 1 completes (ends) so that the bottle-neck problem according to the data transfer may be drastically reduced.

Figures 4A, 4B:
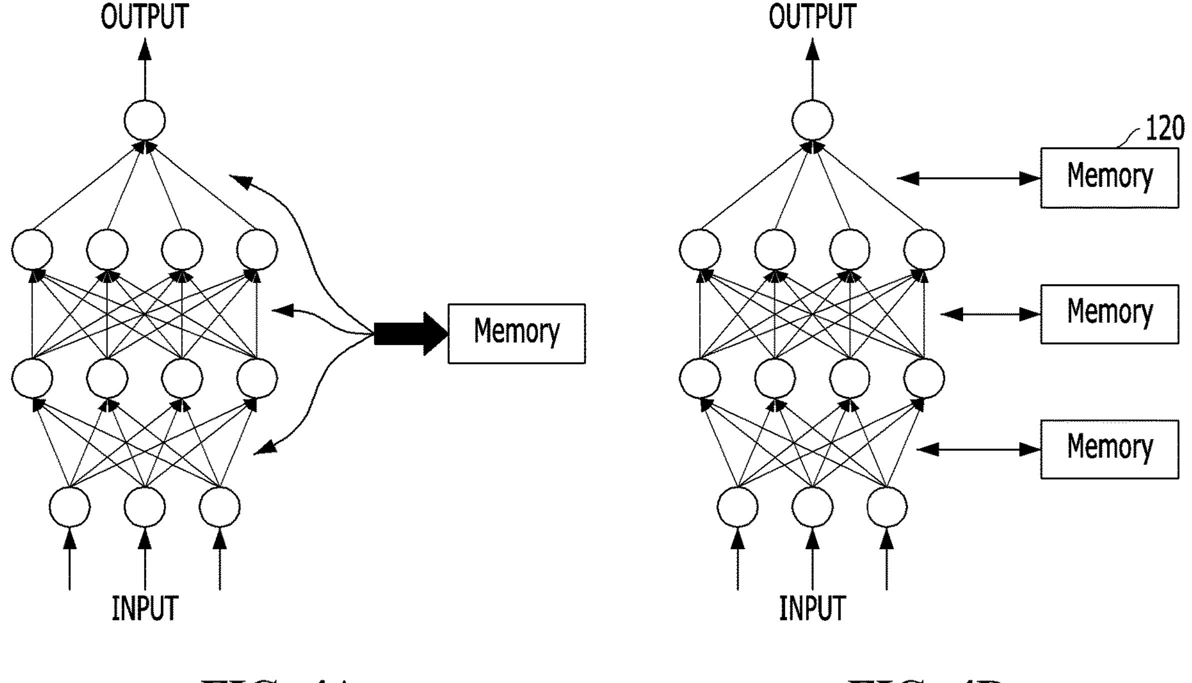
FIGS. 4A and 4B are conceptual views of comparing a structure of a neural network model of the related art and a structure of a neural network model built by a processing apparatus for a neural network calculation disclosed in the present disclosure.

FIGS. 4A and 4B are conceptual views comparing a structure of a neural network model of the related art and a structure of a neural network model built by a processing apparatus for neural network calculation disclosed in the present disclosure.

Referring to FIGS. 4A and 4B, as illustrated in FIG. 4A, the processing apparatus for neural network learning of the related art is designed to have a structure in which data is read from a signal memory to be allocated to each weight and the weight which is completely calculated is stored in the single memory. However, as illustrated in FIG. 4B, the processing apparatus 100 disclosed in the present disclosure disposes the weight memory 120 in each layer which forms the neural network or each neuron and directly stores the calculation (computation) result of the processor unit 110 in the weight memory 120 so that as compared with the neural network structure of the related art, parallel and distributed calculation for the learning of the neural network may be performed. Accordingly, the process of transmitting the weight to be stored in the memory and a process of calling the previously stored weight from the memory are omitted as compared with the related art structure so that the processing speed may be improved.

Figure 5:
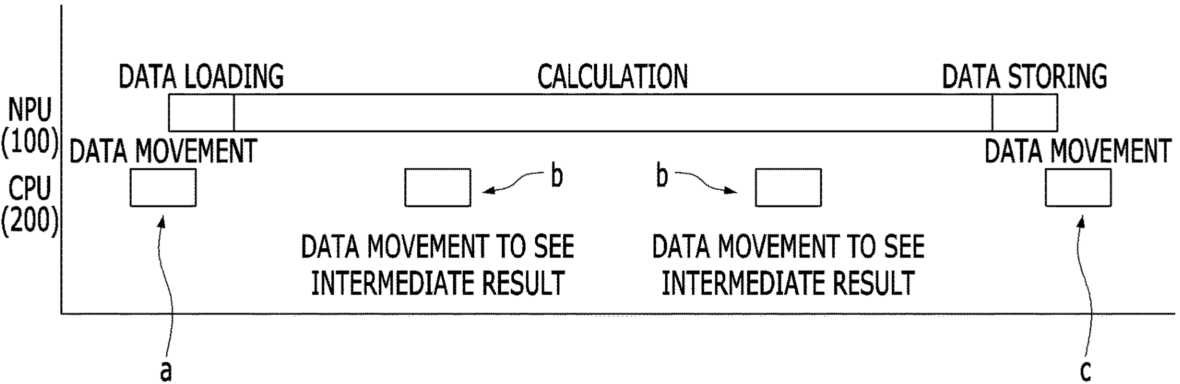
FIG. 5 is a view time-sequentially illustrating a data movement flow of a processing apparatus for a neural network calculation according to an exemplary embodiment of the present disclosure and a central processing unit.

FIG. 5 is a view time-sequentially illustrating a data movement flow of a processing apparatus for a neural network calculation according to an exemplary embodiment of the present disclosure and a central processing unit.

Referring to FIG. 5, if a computing structure in which a processing apparatus (NPU) 100 disclosed in the present disclosure interworks with the central processing unit (CPU) 200 is assumed, the central processing unit 200 which interworks with the processing apparatus 100 is involved only in a data flow (a in FIG. 5) of applying input data applied to the neural network or a data flow (c in FIG. 5) of acquiring output data derived from input data through the neural network model or is involved only in an operation of accessing the memory (b in FIG. 5) to identify an intermediate result for the learning of the neural network performed in the processing apparatus 100.

In other words, even when the processing apparatus 100 interworks with the central processing unit 200, the calculation process of the neural network is managed by the controller 140 of the processing apparatus 100 to minimize the association with the central processing unit 200.

Hereinafter, an operation flow of the present disclosure will be described in brief based on the above detailed description.

Figure 6:
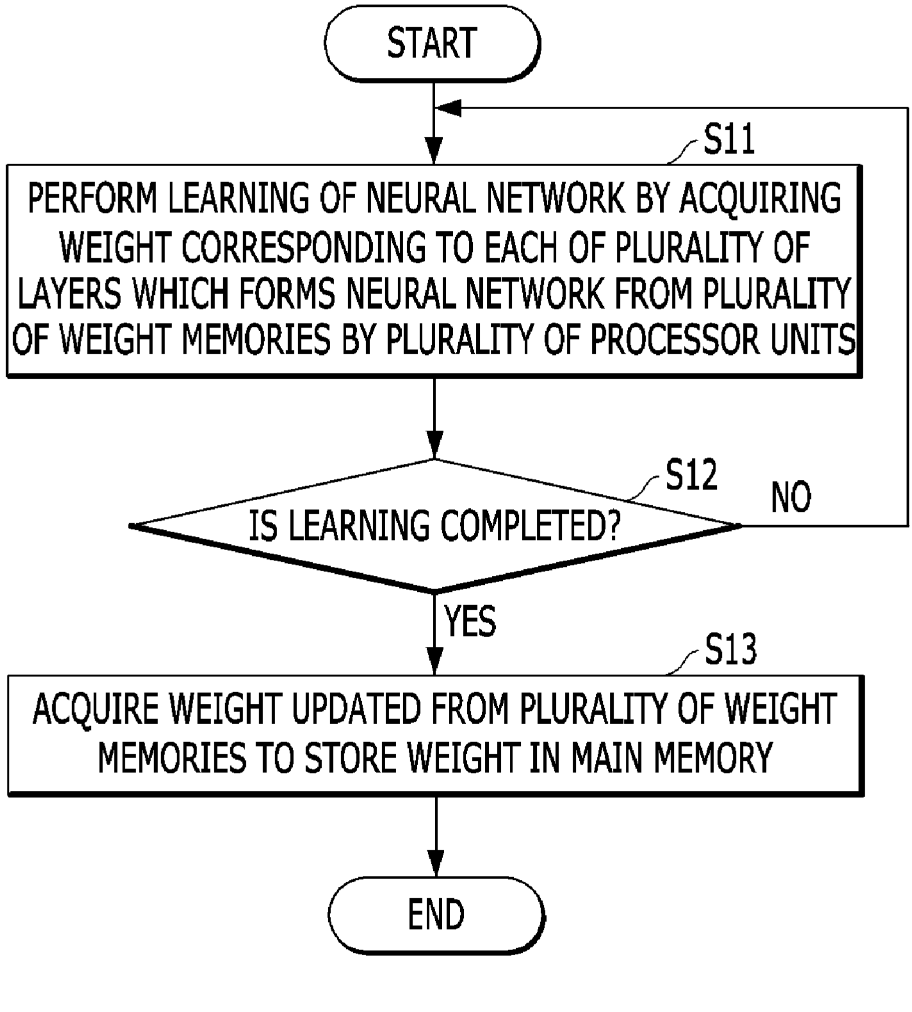
FIG. 6 is a flowchart of an operation of a method for operating a processing apparatus for a neural network calculation according to an exemplary embodiment of the present disclosure.

FIG. 6 is a flowchart of an operation of a method for operating a processing apparatus for a neural network calculation according to an exemplary embodiment of the present disclosure.

The method for operating a processing apparatus for a neural network calculation illustrated in FIG. 6 may be performed by the processing apparatus 100 which has been described above. Therefore, even though some contents are omitted, the contents which have been described for the processing apparatus 100 may be applied to the description of the method for operating a processing apparatus for neural network calculation in the same manner.

Referring to FIG. 6, in step S11, each of the plurality of processor units 110 of the processing apparatus 100 may perform the learning of the neural network by acquiring a weight from the plurality of weight memories 120 which stores a weight corresponding to each of the plurality of layers which forms the neural network.

Next, in step S12, the processing apparatus 100 may determine whether the learning of the neural network is completed through step S11.

If it is determined that the learning of the neural network is completed as a result of determining in step S12, in step S13, the processing apparatus 100 may acquire a weight updated from the plurality of weight memories 120 and store the weight in the main memory 130. For example, in step S13, the controller 140 of the processing apparatus 100 may store the weight (a weight which is updated by the learning in step S11) which is stored in each weight memory 120, in the main memory 130.

In contrast, if it is determined that the learning of the neural network is not completed as the result of determining in step S12, the processing apparatus 100 may repeat the learning of the neural network through step S11 above described.

In the above-description, steps S11 to S13 may be further divided into additional steps or combined as smaller steps depending on an implementation example of the present disclosure. Further, some steps may be omitted if necessary and the order of steps may be changed.

The method for operating a processing apparatus for neural network calculation according to the exemplary embodiment of the present disclosure may be implemented as a program instruction which may be executed by various computer means to be recorded in a computer readable medium. The computer readable medium may include solely a program instruction, a data file, and a data structure or a combination thereof. The program instruction recorded in the medium may be specifically designed or constructed for the present disclosure or known to those skilled in the art of a computer software to be used. Examples of the computer readable recording medium include magnetic media such as a hard disk, a floppy disk, and a magnetic tape, optical media such as a CD-ROM or a DVD, magneto-optical media such as a floptical disk, and a hardware device which is specifically configured to store and execute the program instruction such as a ROM, a RAM, and a flash memory. Examples of the program instruction include not only a machine language code which is created by a compiler but also a high level language code which may be executed by a computer using an interpreter. The hardware device may operate as one or more software modules in order to perform the operation of the present disclosure and vice versa.

Further, the method for operating a processing apparatus for neural network calculation may also be implemented as a computer program or an application executed by a computer which is stored in a recording medium.

The above-description of the present disclosure is illustrative only and it is understood by those skilled in the art that the present disclosure may be easily modified to another specific type without changing the technical spirit or an essential feature of the present disclosure. Thus, it is to be appreciated that the embodiments described above are intended to be illustrative in every sense, and not restrictive. For example, each component which is described as a singular form may be divided to be implemented and similarly, components which are described as a divided form may be combined to be implemented.

The scope of the present disclosure is represented by the claims to be described below rather than the detailed description, and it is to be interpreted that the meaning and scope of the claims and all the changes or modified forms derived from the equivalents thereof come within the scope of the present disclosure.

What is claimed is:

1. A processing apparatus for a neural network calculation, comprising:

a plurality of processor units which performs learning of a neural network;

a plurality of weight memories provided to store a weight corresponding to each of a plurality of layers which forms the neural network;

a main memory which acquires and stores the weight updated from the plurality of weight memories when the learning is completed; and a controller which generates a first control signal associated with at least one of a calculation process for generating output data based on input data of any one layer of the plurality of layers and a target weight acquired from any one weight memory among the plurality of weight memories corresponding to the any one layer of the plurality of layers and an updating process for updating and storing the target weight in the any one weight memory by performing back propagation based on the output data and a second control signal associated with data transfer between the plurality of weight memories and the main memory, wherein each of the plurality of processor units includes:

a calculation unit which performs the calculation process; and a weight updating unit which performs the updating process, wherein the controller generates the second control signal only after completing the learning to suppress a transition between the main memory and the plurality of weight memories before completing the learning, wherein the controller generates the first control signal including a mapping signal which allocates a mapping relationship between the plurality of processor units and the plurality of weight memories based on feature information of the neural network, and wherein the plurality of weight memories partitions a single memory, and a partition structure of the single memory is determined based on a number of layers and a number of neurons of the neural network.

2. The processing apparatus according to claim 1, wherein the calculation unit includes an adder and a multiplier.

3. The processing apparatus according to claim 1, wherein the plurality of processor units is provided with a parallel distributed processing structure in which each processor unit independently performs the calculation process and the updating process.

4. The processing apparatus according to claim 1, wherein the plurality of processor units is provided with a single instruction multiple data (SIMD) structure in which each processor unit performs the calculation process in parallel based on different input data and the first control signal.

5. A method for operating a processing apparatus for a neural network calculation, comprising:

performing, by a plurality of processor units of the processing apparatus, learning of a neural network by acquiring a weight from a plurality of weight memories which stores the weight corresponding to each of a plurality of layers which forms the neural network, by a plurality of processor units;

acquiring and storing the weight updated from the plurality of weight memories in a main memory when the learning is completed;

generating, by a controller of the processing apparatus, a first control signal associated with at least one of a calculation process for generating output data based on input data of any one layer of the plurality of layers and a target weight acquired from any one weight memory among the plurality of weight memories corresponding to the any one layer and an updating process for updating and storing the target weight in the any one weight memory by performing back propagation based on the output data; and generating, by the controller, a second control signal associated with a data transfer between the plurality of weight memories and the main memory, wherein the performing the learning of the neural network includes:

performing the calculation process; and performing the updating process, wherein the generating the second control signal is performed after completing the learning to suppress a transition between the main memory and the plurality of weight memories before completing the learning, and wherein the plurality of weight memories partitions a single memory, and a partition structure of the single memory is determined based on a number of layers and a number of neurons of the neural network.

* * * * *